No. 759,282. PATENTED MAY 10, 1904.
H. R. INGLEDUE.
HAY RAKE.
APPLICATION FILED FEB. 24, 1903.
NO MODEL. 2 SHEETS—SHEET 1.
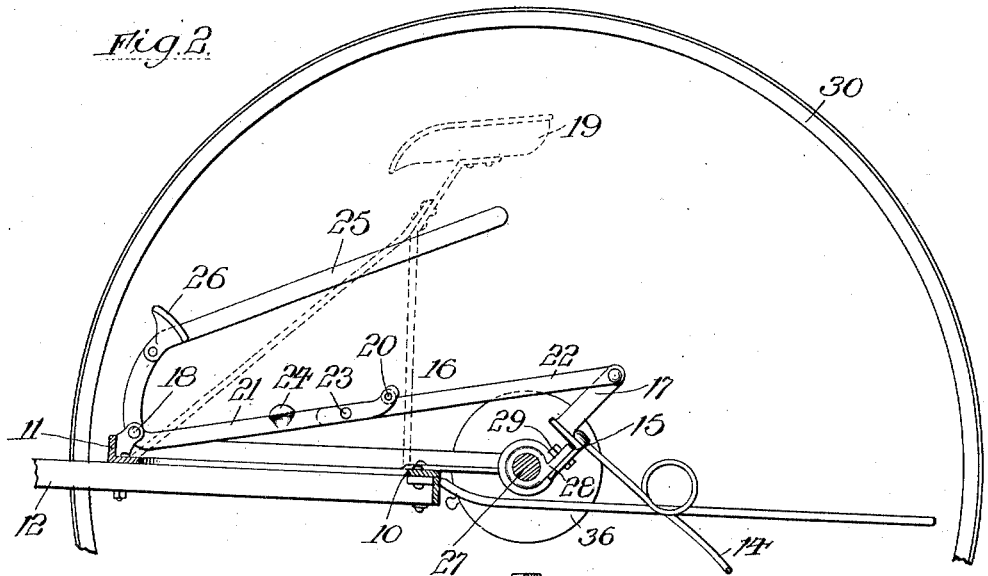
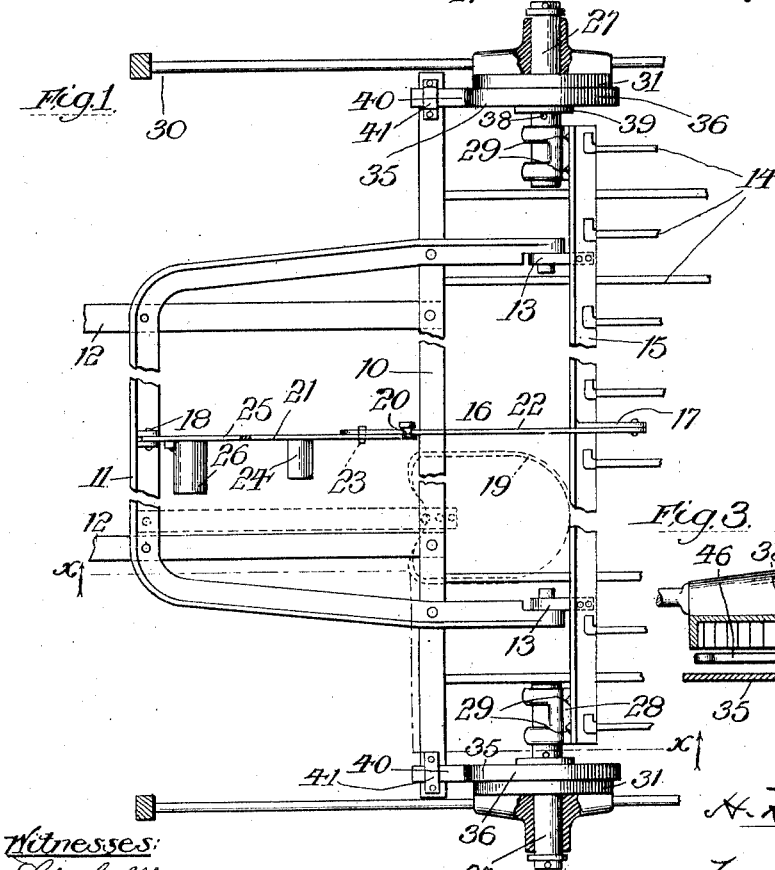
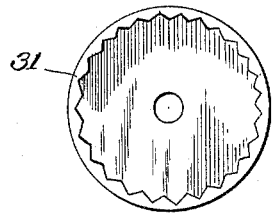
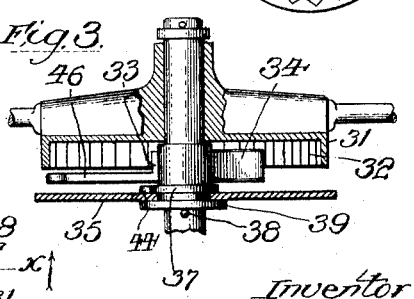

No. 759,282. PATENTED MAY 10, 1904.
H. R. INGLEDUE.
HAY RAKE.
APPLICATION FILED FEB. 24, 1903.
NO MODEL. 2 SHEETS—SHEET 2.

Witnesses:
Inventor:

No. 759,282.                                    Patented May 10, 1904.

UNITED STATES PATENT OFFICE.

HARVEY R. INGLEDUE, OF CHICAGO, ILLINOIS.

HAY-RAKE.

SPECIFICATION forming part of Letters Patent No. 759,282, dated May 10, 1904.

Application filed February 24, 1903. Serial No. 144,686. (No model.)

*To all whom it may concern:*

Be it known that I, HARVEY R. INGLEDUE, a citizen of the United States, and a resident of Chicago, county of Cook, and State of Illinois, have invented certain new and useful Improvements in Hay-Rakes, of which the following is a specification and which are illustrated in the accompanying drawings, forming a part thereof.

This invention relates to improvements in hay-rakes which are automatically operated to dump the load through the medium of a connection with the running-gear thereof.

In carrying out the invention the rake-head is pivotally mounted on a supporting-frame and locked in operative position by means of a lever or other suitable mechanism controlled by the operator. The ends of the head are also rigidly attached to stub-axles, about which the carrying-wheels of the rake turn and carry pawls, which when the machine is raking are held out of engagement with ratchets carried by or attached to the carrying-wheels of the rake. The arrangement is such that when the rake-locking means are released the rake-head is turned slightly due to the resistance of the load, thereby throwing into action the clutches by the engagement of the pawls with the wheel-ratchets and raising the rake to dump its load. As soon as the rake has reached a predetermined position the pawls are automatically thrown out of action and reset, and the rake having been released drops by gravity into raking position and is there locked again.

The invention consists of the combination and arrangement of parts hereinafter fully described, particularly designated in the claims, and illustrated in the accompanying drawings, in which—

Figure 5:
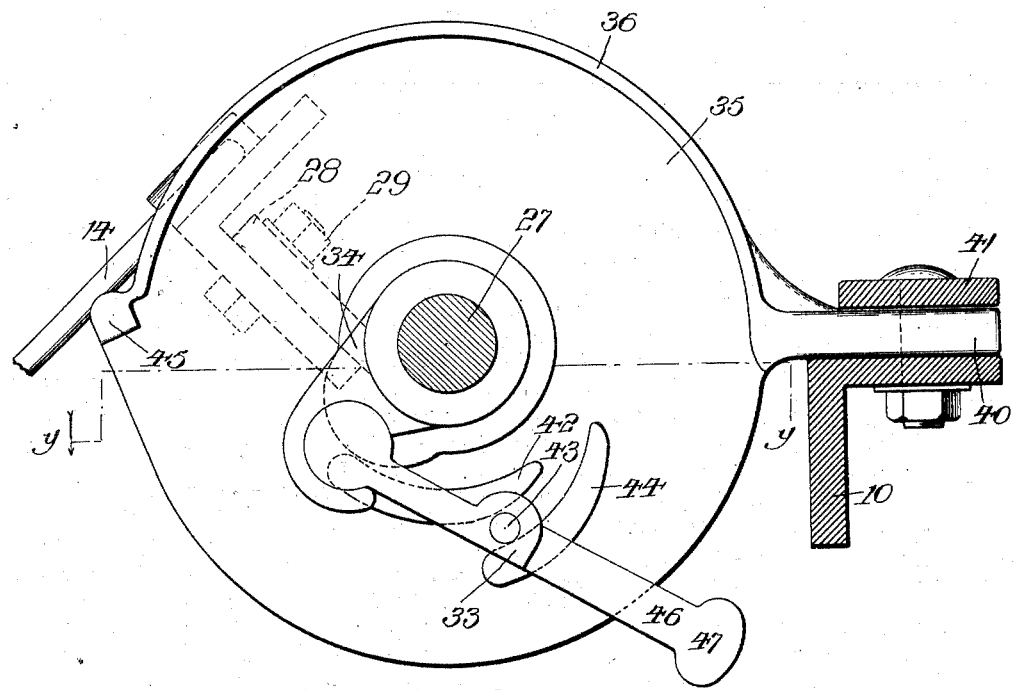
Figure 6:
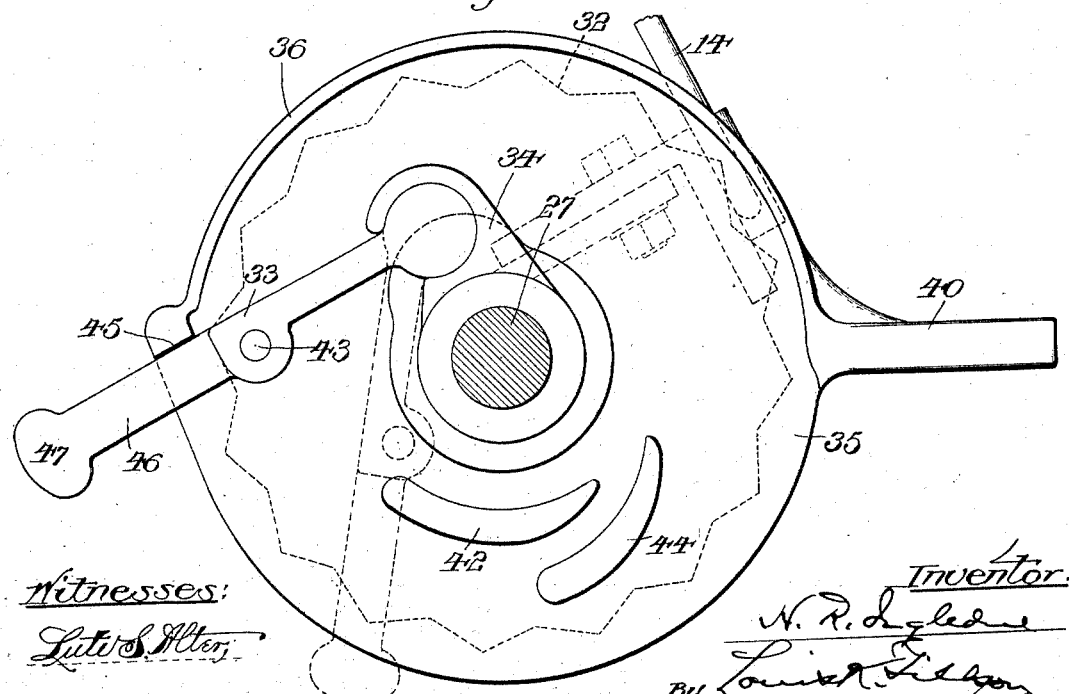

Figure 1 is a plan of a hay-rake constructed in accordance with my invention. Fig. 2 is a section on the line *x x* of Fig. 1, particularly showing the means for locking the rake in its active position. Fig. 3 is a section, on a reduced scale, through one of the operating-clutches on the line *y y* of Fig. 5. Fig. 4 is a detail of the ratchet member of such clutch. Fig. 5 is a view, on an enlarged scale, of the pawl member of the clutch and the guide and supporting-cams therefor, the pawl being shown in its normal or inactive position; and Fig. 6 is a view of the same parts just as the pawl is being tripped and thrown out of engagement with the ratchet shown in dotted lines and of the pawl as it rests upon the guide-cam, which directs it back to the position shown in Fig. 5.

The rake-frame may be of any desired construction. As shown, it may consist of a transverse bar 10 and a forwardly-extending U-shaped member 11, the arms of which are secured to the transverse bar. The shafts 12 are attached to the bar 10 and member 11.

Pivoted to the frame in any suitable manner, as to the rearwardly-extending ends of the arms of the U-shaped member 11, (shown in Fig. 1,) as at 13, so as to raise or lower when turned the rake-teeth 14, attached thereto, is a transverse rake-head 15.

Suitable means are provided to lock the head 15 against movement when the teeth are in operative position, and such means may consist of a jointed lever 16, pivoted at one end to a radial arm 17, fixed to the rake-head 15, and at the other end to a convenient point on the frame, as at 18, the said lever extending longitudinally of the machine and near enough to the seat 19 to be easily reached by the foot of the operator.

The lever 16 is in the form of a toggle and is limited in its closing movement by a stop 20, fixed to the forward member 21 of the lever and resting against the other member 22 back of the pivotal connection 23. To effectively lock the lever, the central pivot 23 is disposed below the line of the end pivots. This is accomplished in the present construction by passing the pivot 18 through the upturned bend of the member 21, as shown in Fig. 2.

A foot-rest 24 is fixed to the lever 16, and the forward end of the latter is extended backwardly, as at 25, so as to be conveniently reached by the hand of the operator to break the toggle-joint to permit the rake to rise, and a foot-rest 26 may also be placed on this extension for accomplishing the same purpose.

It being observed that the rake is under normal conditions or when in operative position locked against movement, it will be further noted that when the toggle is bent the rake is free to be turned on its hinges on the frame and elevated, so as to dump its load. This result is accomplished automatically as soon as the rake-locking means are released and through the medium of the mechanism now to be described, although it is to be observed that various modifications may be made therein without departing from the spirit of the invention.

Fixed to each end of the rake-head is a stub-axle 27, coaxial with the rake-head pivots 13, and shown in the drawings as provided with an integral flange 28, which is clamped to the rake-head by bolts 29, and mounted loosely on the axles 27 are the carrying-wheels 30, the inner face of each of which is provided with a ratchet-wheel, which may consist of an annular flange 31, provided with teeth 32 on the inner face thereof, as shown in Fig. 4. The axle of each wheel is provided with a pawl or dog 33, pivoted to the under side of a crank-arm 34, rigid with the axle and adapted to coact with the ratchet.

Concentric with the axle 27, but loose thereon, is a plate or disk 35, which may have at its upper edge a flange 36, overhanging the flange 32, in order to prevent the ingress of dust and hay to the clutch mechanism, and this plate may be held against lateral movement by a collar 37, fixed on the axle at one side of the disk, and a pin 38, holding a collar 39 at the other, as shown in Fig. 3, and against rotary motion when the axle is clutched to its wheel by an arm 40, extending forwardly therefrom and held to the adjacent end of the transverse bar 10 by a clip 41. The clip 41 holds the arm 40 loosely, permitting the latter slight play, particularly in a longitudinal direction, in order to compensate for possible inaccuracies in the alinement of the axles with the rake-hinges 13.

The disk 35 is provided on its inner face, or that adjacent the wheel, with a pair of cams, one of which is particularly designed to support the pawl 33 while out of action and the other to guide the pawl to the supporting-cam when the pawl is thrown out of action. As shown in Figs. 5 and 6, the guide-cam 42 may be in the form of a curved flange substantially concentric with the axle and located under the latter and spaced therefrom to permit a pin or stud 43, fixed to the pawl, to slide thereon. Extending from beyond the forward end of the cam 42 and located under the same is a second cam 44, which curves downwardly to adjacent the ratchet 32.

The disk 35 is provided with a stop 45, disposed in the path of the pawl 33, or an extension 46, located at the side thereof and which passes out between the ratchet-flange and the disk 35, as shown in Figs. 3 and 6, the stop being so disposed that it arrests the pawl in order to permit of its being forced out of engagement with the ratchet, as hereinafter explained.

In operation when it is desired to dump the rake the joint of the lever 16 is broken either by lifting the lever-arm 25 by hand or by pressing with the foot upon the rest 26. This unlocks the rake, and the latter, owing to the resistance of its load, rises far enough to turn the axles 27, so as to throw the pawls off the cams 44, upon which they normally rest, whereupon they drop into engagement with the ratchets and are held there by reason of the weight of the rake and load. This action clutches the axles 27 to the carrying-wheels, and the latter continuing to rotate turn the axles, and consequently the rake-head fixed thereto, on their pivots 13. At or about the time the rake has been elevated far enough to drop its load the extensions 46 of the pawls come into engagement with the stops 45, and by means of the beveled face of the tooth with which each pawl is engaged the latter is forced inwardly out of engagement with the ratchet, the stub-shafts being pushed around by the inward movement of the pawls. The opposite faces or back of the ratchet-teeth are also beveled, as shown in Fig. 4 and in dotted lines, Fig. 6, to permit of the machine backing or turning in the field when the pawls are in active position. In such case the pawl or pawls will simply slide over the ratchet-teeth.

When engaged by the stops 45, the pivot of each pawl is in such position that the space above the rear end of the cam 42 is coincident with the arc described by the pin or projection 43 on the pawl, as shown in Fig. 6, and the said pin when the pawl drops by gravity moves onto the cam and slides along the same, then dropping over the end thereof and onto the supporting-cam 44, moving along the latter until it reaches a point near the lower end of said cam, as shown in Fig. 5, when it is again set or in position to be thrown into action. The rake having been released by the withdrawal of the pawls 33 drops by gravity into active position and with sufficient force to straighten the lever 16, and thereby lock itself automatically. Should it fail to do so at any time, the operator has but to press with his foot upon the foot-bar 24. The length of the lever when straight defines the movement of the rake and is just long enough to hold the latter in right relation with the ground.

When the rake is in action, any incidental play thereof will be compensated for by the play of the pins 43 on the supporting-cams 44, inasmuch as the pawls are permitted the necessary movement without sliding off the said cams.

The arms 46 of the pawls 33 may be provided with weights 47 in order to overcome any tendency thereof to stick or hang, thereby insuring their dropping when thrown into and out of action.

While a pair of clutches are shown and described, it is to be observed that one only might be employed without affecting the operation of the machine in any particular. In practice, however, it is preferred to employ two of such clutches.

I claim as my invention—

1. In a hay-rake, in combination, an oscillating rake-head, carrying-wheels coaxial therewith, ratchet-and-pawl connection between one of the wheels and the rake-head, an automatic release for the pawl, and a supporting return-guide for the pawl.

2. In a hay-rake, in combination, an oscillating rake-head, carrying-wheels coaxial therewith, ratchet-and-pawl connection between one of the wheels and the rake-head, an automatic release for the pawl, a supporting return-guide for the pawl, and a support receiving the pawl when released.

3. In combination, a pivoted rake, releasable means for locking the rake in operative position, carrying-wheels, means for automatically clutching the rake to one of the wheels upon the release of the locking means, and means for throwing the clutch out of action.

4. In combination, a pivoted rake, releasable means for holding the rake in operative position, carrying-wheels, and a clutch for coupling the rake to one of the wheels and which is thrown into action upon the release of the holding means by the movement of the rake due to the resistance of the load, and means for throwing the clutch out of action.

5. In combination, a pivoted rake, releasable means for holding the rake in operative position, carrying-wheels, a ratchet on one of the wheels, a pawl pivotally carried by the rake and normally inactive, and which pawl is thrown into engagement with the ratchet upon the release of the holding means by the initial movement of the rake due to the resistance of the load, and means for throwing the pawl out of engagement with the ratchet.

6. In combination, a pivoted rake, releasable means for holding the rake in operative position, carrying-wheels, axles attached to the ends of the rake and on which the wheels are mounted, a crank-arm on one of the axles, a ratchet on the wheel of the latter axle, a pawl pivoted to the crank-arm and normally out of engagement with the ratchet and which is thrown into such engagement upon the release of the holding means by the initial movement of the rake due to the resistance of the load, and means for throwing the pawl out of engagement with the ratchet.

7. In combination, a frame, a rake-head pivoted to the frame and provided with teeth, releasable means for locking the rake in operative position, stub-axles coaxial with the rake-pivots and fixed to the ends of the rake-head, wheels loosely mounted on the axles and one of which is provided with a ratchet-wheel concentric with the axle, a crank-arm fixed to the axle, a gravity-pawl pivoted to the arm, a non-rotatable disk loose on the axle, a cam on the disk by which the pawl is normally supported, a stop in the path of the pawl, and a cam for guiding the pawl, when released from the ratchet, to the supporting-cam.

8. In combination, a frame, a rake-head, releasable means for locking the rake in operative position, carrying-wheels in which the ends of the rake-head are loosely supported, a ratchet-wheel concentric with and fixed to one of the carrying-wheels, a pawl carried by the rake-head and normally held out of engagement with the ratchet and which is rendered operative upon the release of the holding means by the initial movement of the rake due to the resistance of the load, and means for throwing the pawl out of action.

9. In combination, a frame, a rake-head, releasable means for locking the rake in operative position, carrying-wheels in which the ends of the rake-head are loosely supported, a ratchet-wheel concentric with and fixed to one of the carrying-wheels, a pawl carried by the rake-head and adapted to coact with the ratchet, a fixed disk concentric with the axis of the rake-head, a downwardly and rearwardly curved cam on the disk and upon which the pawl is normally supported, a stop in the path of the pawl for arresting the latter, and a second cam on the disk located above and projecting back of the rear of the supporting-cam and by which the pawl is guided to the supporting-cam.

10. In combination, a pivoted rake, releasable means for locking the rake in operative position, carrying-wheels running loose on the axis of the head, a ratchet on each wheel, pawls carried by the rake and normally inactive and which pawls are thrown into engagement with the ratchet upon the release of the locking means by the initial movement of the rake due to the resistance of the load, and means for throwing the pawls out of engagement with the ratchets.

11. In combination, a frame, a pivoted rake, an arm fixed to the rake, a jointed lever the ends of which are pivotally attached to the arm and to the frame and which when straightened locks the rake in operative position, means for breaking the joint of the lever, carrying-wheels, means for automatically clutching the rake to the wheels upon the release of the locking-lever, and means for throwing the clutching means out of action.

12. In combination, a frame, a rake-head pivoted to the frame, an arm fixed to the rake-head, a toggle-lever pivotally attached at its ends to the arm and the frame and which when straightened out locks the rake against movement, a lever for breaking the toggle-joint, carrying-wheels, a clutch for automatically coupling the rake-head to one of the wheels upon the breaking of the toggle-joint, and means for throwing the clutch out of action.

13. In combination, a frame, a rake-head pivoted to the frame, an arm fixed to the rake-head, a toggle-lever pivotally attached at its ends to the arm and the frame and which when straightened out locks the rake against movement, a lever for breaking the toggle-joint, stub-axles coaxial with the rake-pivots and fixed to the ends of the rake-head, wheels loosely mounted on the axles and which are provided with internal ratchet-wheels concentric with the axles, crank-arms fixed to the axles, gravity-pawls pivoted to the arms and which engage the ratchets upon the release of the lock, non-rotatable disks loose on the axles, a cam on each disk by which the pawl is normally supported, a stop in the path of the pawl, and a cam for guiding the pawl, when released from the ratchet, to the supporting-cam.

14. In a hay-rake, in combination, an oscillating rake-head, carrying-wheels coaxial therewith, ratchet-and-pawl connection between one of the wheels and the head, an automatic release for the pawl, a return supporting-guide for the pawl, and a second pawl-supporting guide at the end of the first-mentioned supporting-guide and directed toward the ratchet.

15. In combination, an oscillating shaft having a crank-arm, a ratchet-wheel of greater radius than the crank-arm and concentric with the shaft and having internal teeth, the engaging faces of which are backwardly inclined, a gravity-pawl pivoted to the crank-arm and having a ratchet-engaging shoulder, and a fixed stop in the path of the pawl when engaged with the ratchet.

16. In combination, an oscillating shaft having a crank-arm, an internal ratchet-wheel concentric with the shaft and surrounding the crank-arm, a gravity-pawl pivoted to the crank-arm and having a ratchet-engaging shoulder, and a fixed stop in the path of the pawl when engaged with the ratchet.

17. In a hay-rake, in combination, an oscillating rake-head having an axle fixed to each end, carrying-wheels normally turning about such axles, ratchet-and-pawl connection between one of the wheels and its axle, an automatic release for the pawl, and a supporting return-guide for the pawl.

18. In a hay-rake, in combination, an oscillating rake-head having an axle fixed to each end, carrying-wheels normally turning about such axles, ratchet-and-pawl connection between one of the wheels and its axle, an automatic release for the pawl, a supporting return-guide for the pawl, and a support receiving the pawl when released.

19. In combination, a pivoted rake-head, carrying-wheels coaxial therewith, a releasable rake-locking lever, a ratchet-wheel concentric with and fixed to one of the wheels, a crank-arm fixed to the rake-head, a pawl pivoted to the crank-arm, a pawl-support, a guide for directing the pawl to the support, and a stop in the path of the pawl when engaged with the ratchet.

20. In a rake, in combination, a frame, an oscillating rake-head mounted thereon, carrying-wheels, means for automatically coupling the rake-head to one of the wheels, a crank-arm fixed to the rake-head, a jointed locking-bar pivoted at one end to the crank-arm and at the other to the frame, and an arm fixed to the locking-bar for breaking the joint.

21. In a rake, in combination, an oscillating rake-head, means for locking the rake-head in its active position, carrying-wheels one of which is provided with a ratchet, a gravity-pawl carried by the rake-head and coacting with the ratchet, and a support for the pawl when the rake-head is in its advanced position.

22. In a rake, in combination, a frame, an oscillating rake-head mounted thereon, carrying-wheels one of which is provided with a ratchet, an automatically-acting pawl engageable with the ratchet, a stop for arresting the pawl, a crank-arm fixed to the rake-head, a jointed locking-bar pivoted at one end to the crank-arm and at the other to the rake-frame, and an arm fixed to the bar for breaking the joint.

23. In a rake, in combination, a frame, an oscillating rake-head mounted thereon and having a rigid crank-arm, a pawl pivoted to the crank-arm, carrying-wheels one of which is provided with an internal ratchet engageable by the pawl, a stop in the path of the pawl, a a second crank-arm fixed to the rake-head, a jointed locking-bar pivoted at one end to the latter crank-arm and at the other to the rake-frame, one member of the bar constituting a lever for controlling the bar.

HARVEY R. INGLEDUE.

Witnesses:
 CHAS. W. NOVAK,
 WENARD DILLEMUTH.